United States Patent

[11] 3,583,671

| [72] | Inventor | Enid W. Hufford<br>22112 Woodinville Snohomish Highway<br>Woodinville, Wash. 98072 |
|---|---|---|
| [21] | Appl. No. | 830,160 |
| [22] | Filed | June 3, 1969 |
| [45] | Patented | June 8, 1971 |

[54] ANGLE VALVE FOR PLUMBING FIXTURE
3 Claims, 4 Drawing Figs.

[52] U.S. Cl. ................................................ 251/367
[51] Int. Cl. ......................................... F16k 27/00
[50] Field of Search ................................... 251/367;
137/583; 251/340, 341, 342, 343, 344, 345, 346, 347

[56] References Cited
UNITED STATES PATENTS

| 3,052,444 | 9/1962 | Kintner | 251/367X |
|---|---|---|---|
| 3,321,177 | 5/1967 | Fendel et al. | 251/347X |
| 3,460,804 | 8/1969 | Balon | 251/346X |
| 2,214,250 | 9/1940 | Landrum | 251/367X |
| 2,353,549 | 7/1944 | Dalzell et al. | 251/367X |
| 2,665,712 | 1/1954 | Pratt | 251/367X |
| 2,840,337 | 6/1958 | Sasserson et al. | 251/367X |
| 3,039,489 | 6/1962 | Botkin | 251/367X |
| 3,110,471 | 11/1963 | Kuhles | 251/367X |
| 3,220,693 | 11/1965 | Dickson | 137/583X |
| 3,290,003 | 12/1966 | Kessler | 251/367X |
| 3,456,679 | 7/1969 | Graham | 137/583X |

*Primary Examiner*—Samuel Scott

ABSTRACT: A convertible valve structure having a first main portion adapted to be secured to the main fluid supply line and including a flow impeding means and a second portion detachable from the first portion including a means adapted for connection to a plumbing fixture for fluid transmission from the first portion. The convertible valve allows the main portion to be installed, the plumbing checked for leaks, and then the remainder of the surrounding structure completed. Following completion of the wall surfaces, etc. the second portion of the valve is attached to the first portion and connection is completed to the appropriate fixture without necessitating turning off the water or draining the system.

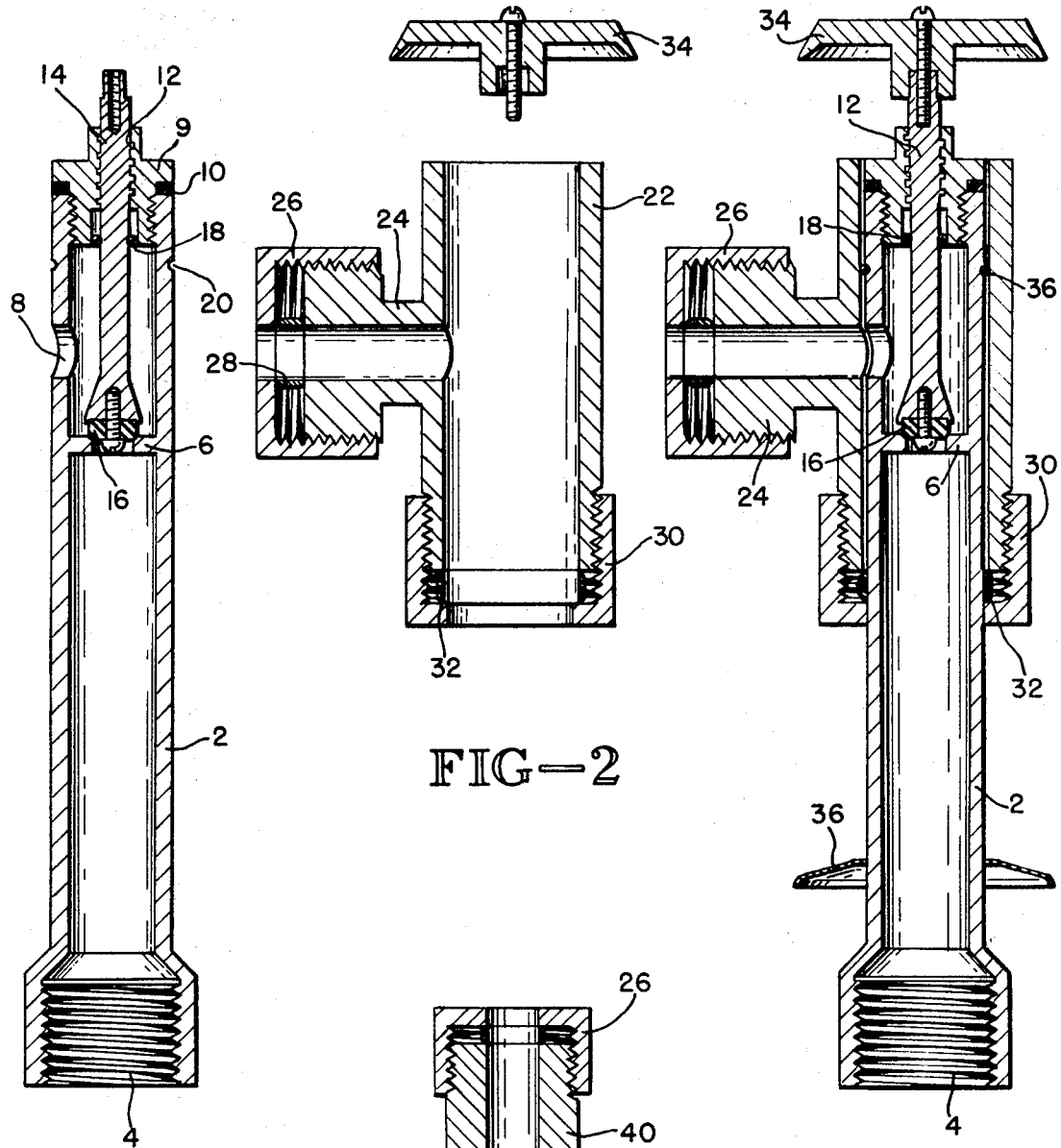

ANGLE VALVE FOR PLUMBING FIXTURE

BACKGROUND OF THE INVENTION

In the construction of apartment buildings, office buildings and the like, it is the standard practice to install the main plumbing supply lines early in the construction of the building. Junctions and outlets are placed in appropriate places, positions for the bathrooms, kitchens, and the like, and the entire system is tested for leaks. Following completion of the walls and other surrounding surfaces such as cabinetry, the pipe is uncapped and the appropriate valve placed within the system and the connection made to the plumbing fixture followed by again turning on the water and bleeding the system if necessary.

The necessity of capping the system and later the removal of the caps and placement of the valves within the system is both time consuming and expensive.

Many times the owner of the building is anxious to place the building in operation a portion at a time. Portions occupied prior to the completion of the plumbing installation must necessarily be without water during the period when the plumbers are removing the caps on the plumbing and installing the appropriate valves in newly completed sections, an inconvenience to the residents and time consuming for the plumber. The plumber again has to turn off the water and drain the entire system such that he may open the appropriate plumbing outlet whereat he is making the final connection.

It is an object of the present invention to provide a plumbing valve which may be attached to the main plumbing system during construction said plumbing valve including a valve stem and valve seat whereby the water may be turned off. The valve has a second portion which is easily attachable or removable which includes the water conduit means for carrying the water from the plumbing system to the plumbing fixture as well as the attractive finish required for aesthetics.

Another object of the present invention is to provide a plumbing valve whereby the entire plumbing system within a building may be tested and then the water left on and remain in the pipes during the remainder of the construction. The fact that the water may be left in the "on" condition eliminates the need for the continuous, time consuming draining of the water system during installation of the valves.

Yet another object of the present invention is to permit a partial, uninterrupted use of the plumbing within a building while the remainder of the building is in the process of being completed and yet there is a ready water supply to the entire building.

Still a further object of the present invention is to provide a portion of a valve used to terminate the piping which is of the same size as the pipe being served, permitting an orderly installation of walls, cabinets, and the like.

BRIEF DESCRIPTION OF THE DRAWINGS

FIG. 1 is a sectional view of the main portion of the valve used to terminate the piping when the building is in roughed-in stage.

FIG. 2 is a sectional view of the second portion of the valve adapted to be locked to the main portion shown in FIG. 1.

FIG. 3 is a sectional view through a completed valve structure ready for use.

FIG. 4 is a sectional view through a spud-type adapter to be used on larger size valves.

DETAILED DESCRIPTION OF THE DRAWINGS

As can be seen in FIG. 1, the main portion of the valve comprises an elongated hollow, cylindrical valve casing 2 having threads 4 at one end thereof for attachment to the main building pipes. It is to be understood that the method of securing the valves to the building piping may take any one of a standard variety of securements such as threaded joints, soldered joints, brazing, compression, or flare fittings. The end of the valve casing opposite to the threaded portion, as shown in FIG. 1, includes an internally projecting flange 6 serving as a valve seat, spaced from the end of the casing. Between the internally projecting flange 6 and the end of the casing is a radial port 8 extending through the wall of the casing for purposes hereinafter described. Threaded into the internal portion of the casing 2 is a packing nut 9 having appropriate washer or seal 10 to insure a leaktight fit. Packing nut 8 has a standard internal thread 12 for mating with a valve stem 14 which extends inwardly axially of the casing 2 and terminates in a bib washer 16 for terminating the flow of fluid through the casing when compressed against seal 6. Surrounding the valve stem 12 is an O-ring 18 preventing leakage around the valve stem.

When in operation and connected to the building piping, water would enter the valve casing 2 via the end 4, pass through the center of the internally projecting flange 6, when the valve is open, and pass outwardly through port 8. It is to be understood that the portions of the casing 2 which are adapted to be exposed in the finished system may well be chrome plated. Further, it is within the contemplation of the present invention that since the valve casing 2 would be mounted during construction and left in place during the completion of the interior finish, it would be covered with a plastic coating or a cardboard sheath to protect it from damage during the remainder of the construction.

A second portion of the illustrative valve as seen in FIG. 2 comprises a cylindrical shaped main body section 22 having an inside diameter slightly larger than the outside diameter of the valve casing 2 such that it may be easily slipped over the valve casing 2. Projecting radially from the main portion 22 is a hollow port 24 threaded to receive a compression nut 26. A compression ring 28 is shown between the compression nut and the port since a standard connection to the fixture is by means of tubing compression sealed within the hollow port 24. It is to be understood that the connection may equally well be by means of the standard threads or a soldered joint. The second portion of the valve 22 is adapted, in the preferred embodiment, to be attached to the main valve casing by means of a compression nut 30 and a compression ring 32.

The completed valve when ready for use including having the handle 34 in place as shown in FIG. 3. It is to be noted in FIG. 3 that an O-ring 36 has been placed between the two portions of the valve such that it rests within groove 20 in the main valve body 2 providing a fluidtight seal and a canopy flange 36 has been added for appearance.

It is to be understood that it is well within the contemplation of the present invention that the attachment between the primary and secondary portions of the valve could equally well be done by means of a snap ring or perhaps a locking pin in conjunction with O-rings to prevent leakage of the liquid.

Referring now to FIG. 4 it can be seen that an alternate construction of the valve would eliminate O-ring groove 20 in that the outlet port 40 is threaded as at 42 to mate with a complementary thread within the port 8. This embodiment would be primarily used for larger sized valves such as flush valves and the like, but is not intended to be limited thereto.

The embodiments of the invention in which I claim an exclusive property or privilege are defined as follows:

1. A valve having a first body portion comprising an elongated cylindrical valve casing having an internal shoulder distal from the ends thereof, a radial port disposed intermediate one end and the shoulder, the end of the casing adjacent the port having internal threads having mated therewith a threaded nut, a valve stem threaded through the nut extending into the valve casing to sealingly engage the shoulder and outwardly to receive a handle, a second hollow body portion adapted to be sealingly secured to the first body portion said second body portion having a passage adapted to be secured in communication with the port, providing a fluid passage when the stem is not sealed against each shoulder at the first body portion.

2. A convertible plumbing valve structure comprising a first section adapted to be permanently installed during construction of the facility being plumbed and a second section adapted to be separated from the first section and easily reattached thereto, said first section comprising a valve casing having a first end adapted for attachment to the main line and a second end having a packing nut threaded therein with an associated valve stem having a handle, valve seat within the casing adapted to terminate the water flow, and a radial port located between the valve seat and said second end, the second section comprising a hollow cylindrical casing adapted to be telescoped and secured over the first section and having a port adapted for alignment with the port in the first section and the second end whereby the system may be pressurized with only the first portion connected and the second section may be easily connected following the final finishing of the surrounding wall.

3. A valve as in claim 2 wherein the two portions are secured by a compression nut.